(12) United States Patent
Acker et al.

(10) Patent No.: US 11,517,994 B2
(45) Date of Patent: Dec. 6, 2022

(54) ABRASIVE BLAST CABINET LIGHTING AND STRUCTURE

(71) Applicant: Titan Abrasive Systems, Warminster, PA (US)

(72) Inventors: Brandon Acker, Warrington, PA (US); Brian Fox, Newmanstown, PA (US)

(73) Assignee: Titan Abrasive Systems, Warminster, PA (US)

(*) Notice: Subject to any disclaimer, the term of this patent is extended or adjusted under 35 U.S.C. 154(b) by 31 days.

(21) Appl. No.: 17/363,417

(22) Filed: Jun. 30, 2021

(65) Prior Publication Data

US 2022/0063045 A1   Mar. 3, 2022

Related U.S. Application Data

(60) Provisional application No. 63/071,501, filed on Aug. 28, 2020.

(51) Int. Cl.
*B23Q 17/24* (2006.01)
*B24C 9/00* (2006.01)

(52) U.S. Cl.
CPC ............ *B23Q 17/2404* (2013.01); *B24C 9/00* (2013.01)

(58) Field of Classification Search
CPC . F21W 2131/403; B23Q 17/2404; B24C 9/00
See application file for complete search history.

(56) References Cited

U.S. PATENT DOCUMENTS

| 5,971,837 A | * | 10/1999 | McDavid | ................. B24C 9/00 451/87 |
| 6,712,677 B2 | * | 3/2004 | Williams | ................. B24C 9/00 451/89 |
| 6,878,046 B2 | * | 4/2005 | Publ | ........................ B24C 9/00 451/36 |
| 2020/0156123 A1 | * | 5/2020 | Burlew | ................. A61B 90/70 |

* cited by examiner

*Primary Examiner* — William J Carter
(74) *Attorney, Agent, or Firm* — Ballard Spahr LLP

(57) ABSTRACT

An abrasive blast cabinet uses a space frame to support panels defining an enclosed volume. One of the panels defines a view port and access ports. Illumination devices positioned on the one panel adjacent to and/or surrounding the view port illuminate the enclosed volume without significant shadowing, glare or reflections. The illumination devices are captured between a frame and the one panel and are protected from the blast environment by channel members which are covered by a transparent plate overlying the view port.

18 Claims, 5 Drawing Sheets

ABRASIVE BLAST CABINET LIGHTING AND STRUCTURE

CROSS REFERENCE TO RELATED APPLICATIONS

This application is based upon and claims benefit of priority to U.S. Provisional Application No. 63/071,501, filed Aug. 28, 2020 and hereby incorporated by reference herein.

FIELD OF THE INVENTION

This invention relates to cabinets for abrasive blasting operations.

BACKGROUND

Abrasive blast cabinets are part of an abrasive blasting apparatus for treating a work piece with an abrasive medium, such as aluminum oxide, glass beads and plastic beads, propelled under pressure against a surface of the work piece to prepare or shape the surface, or to remove paint, dirt, or other coatings or contaminants.

For relatively small work pieces cabinets are used in a closed loop system to contain and recover the abrasive medium and filter out the unwanted dust and debris. The work space within the cabinet must be adequately illuminated to ensure efficient and thorough operation. Poor illumination which allows shadowing of the work piece, as well as glare and reflections, can cause operator fatigue and lead to incomplete treatment of the work piece. Furthermore, the cabinets should be robust to permit reliable sealing of access doors to minimize the escape of dust, debris and abrasive media into the ambient. There is clearly an opportunity to improve abrasive operations by improving abrasive blasting cabinets.

SUMMARY

The invention concerns an abrasive blast cabinet. In an example embodiment the blast cabinet comprises a plurality of panels attached to one another defining an enclosed volume. A view port is positioned within one of the panels. The view port provides a line of sight into the enclosed volume. At least one illumination device is mounted on the one panel. By way of example, the at least one illumination device is mounted adjacent to the view port. An example embodiment may further comprise a frame mounted on the one panel surrounding the view port. A transparent plate is positioned between the frame and the one panel. The transparent plate overlies the view port. In an example embodiment, the at least one illumination device is positioned between the transparent plate and the frame.

In a further example, the at least one panel may comprise one or more access ports providing access to the enclosed volume. In a specific example, the at least one illumination device comprises a light emitting diode. Further by way of example, the at least one illumination device comprises an incandescent bulb or a fluorescent bulb.

The invention further encompasses an abrasive blast cabinet which, by way of example, comprises a plurality of panels attached to one another defining an enclosed volume. A view port is positioned within one of the panels. The view port provides a line of sight into the enclosed volume. A plurality of illumination devices are mounted on the one panel. In an example embodiment the plurality of illumination devices are positioned surrounding the view port. An example according to the invention may further comprise a frame mounted on the one panel surrounding the view port. A transparent plate is positioned between the frame and the one panel, the transparent plate overlying the view port. In an example embodiment, the plurality of illumination devices are positioned between the transparent plate and the frame. The at least one panel may further comprise one or more access ports providing access to the enclosed volume. By way of example, the plurality of illumination devices may comprise light emitting diodes. Also in an example, the plurality of illumination devices may comprise at least one incandescent bulb or at least one fluorescent bulb.

An example abrasive blast cabinet also encompassed by the invention comprises a space frame formed from a plurality of elongate members attached to one another. A plurality of panels are attached to the elongate members. The panels define an enclosed volume. A view port is positioned within one of the panels. The view port provides a line of sight into the enclosed volume. One or more access ports are positioned within the one panel providing access to the enclosed volume. In a specific example embodiment, the space frame defines a parallelepiped, for example a cube. An example embodiment may further comprise a plurality of legs formed from a plurality of the elongate members. The elongate members may be tubular members and may, for example, have a rectangular cross section.

An example abrasive blast cabinet may further comprise a plurality of illumination devices mounted on the one panel. A frame mounted on the one panel surrounds the view port and a transparent plate positioned between the frame and the one panel, the transparent plate overlying the view port. In a specific example, the plurality of illumination devices are positioned between the transparent plate and the frame. The plurality of illumination devices may comprise light emitting diodes. Further by way of example the plurality of illumination devices may comprise at least one incandescent bulb or at least one fluorescent bulb.

DETAILED DESCRIPTION

Figure 1:
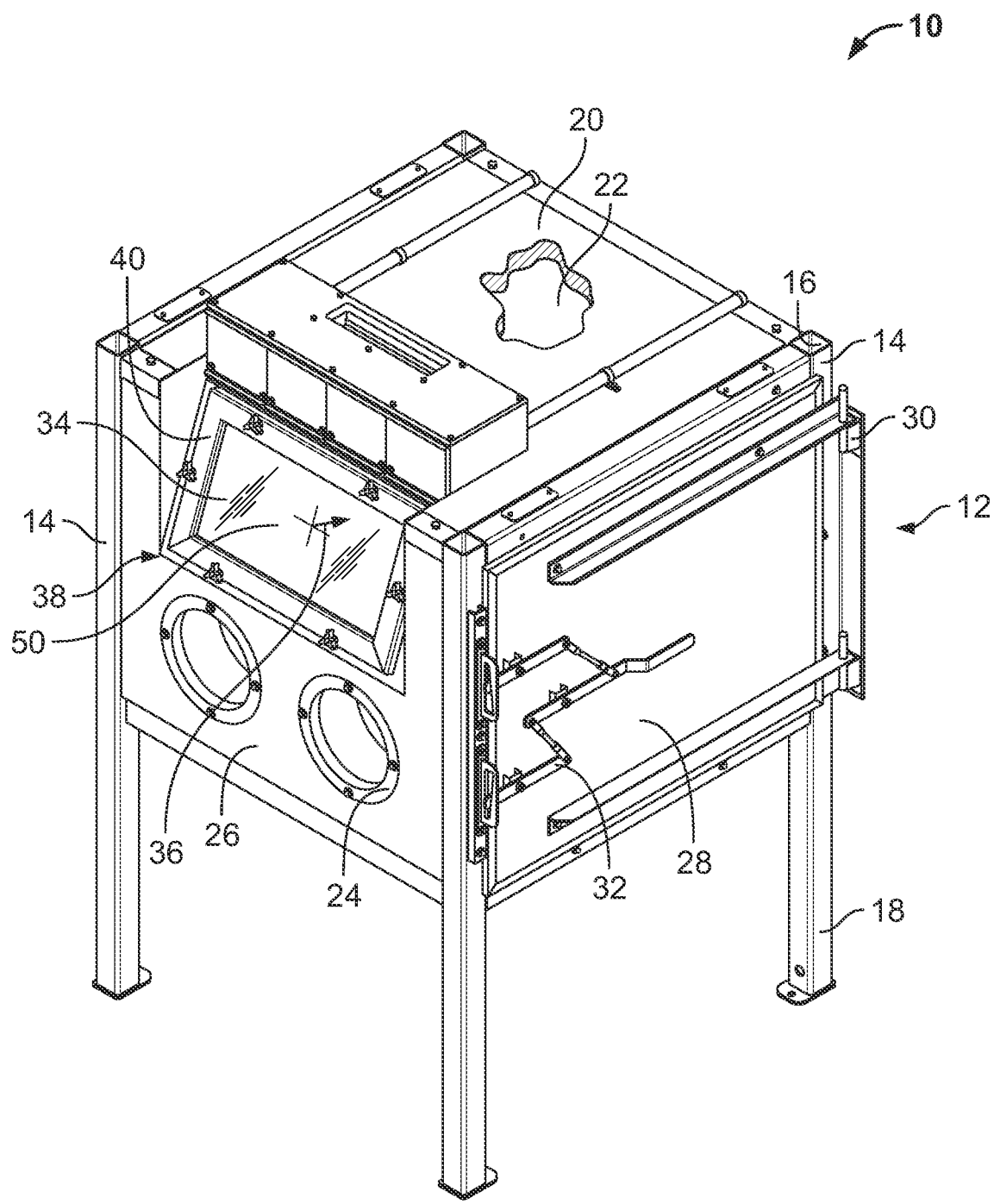
FIG. 1 is an isometric view of an example abrasive blast cabinet according to the invention.

FIG. 1 shows an example abrasive blast cabinet 10 according to the invention. Cabinet 10 comprises a space frame 12 formed from a plurality of elongate members 14 attached to one another. In this example embodiment, space frame 12 defines a parallelepiped shape, specifically a cube, although other three dimensional shapes are also possible for a practical design. Elongate members 14 are advantageously tubular and in this example have rectangular cross sections 16. Other cross sectional shapes, such as round and polygonal are also feasible. Other types of elongate members, including open sectional shapes such as angles, "Tee", and channel sections may also be used. Space frame 12 may further comprise a plurality of legs 18 formed from the elongate members 14 for support. Space frame 12 is advantageously formed of durable materials such as structural steel.

A plurality of panels 20 are attached to the elongate members 14 and/or to one another. The panels 20 define an enclosed volume 22 wherein the abrasive blasting takes place. One or more access ports 24 are positioned within one of the panels 26 and provide access to the enclosed volume 22 for manipulation of the work piece being treated and the blasting nozzle. Panels 20 may also comprise one or more movable doors 28 to permit access to the enclosed volume 22 for loading and unloading the work piece within the cabinet 10. Door 28 in this example is mounted on hinges 30 attached to one of the elongate members 14. A latch mechanism 32 is used to secure the door 28 in the closed position during blasting operations. Like the space frame 12, panels 20 are advantageously formed of durable materials for example, sheet metal.

Figure 2:
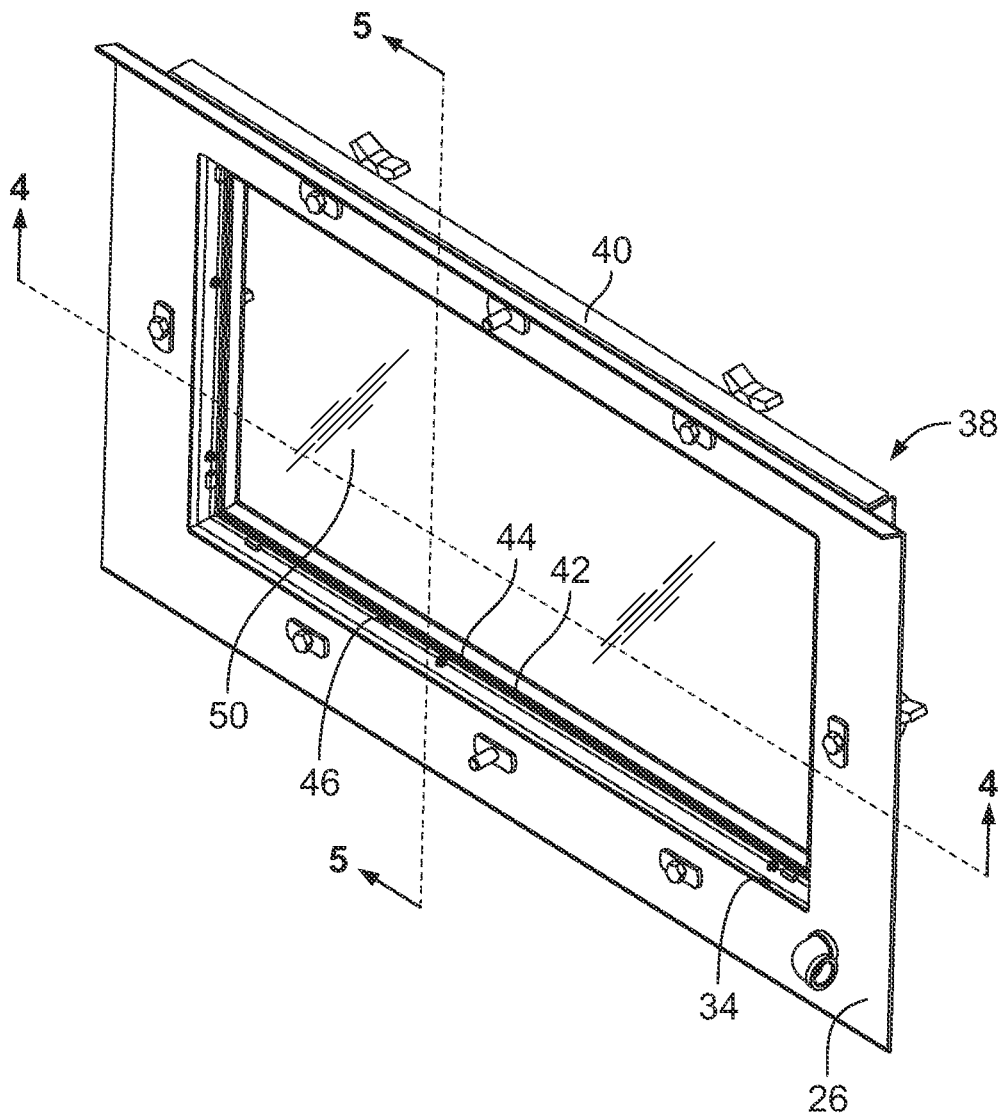
FIG. 2 is an isometric view of a portion of the abrasive blast cabinet shown in FIG. 1 and viewed from within the cabinet.
Figure 3:
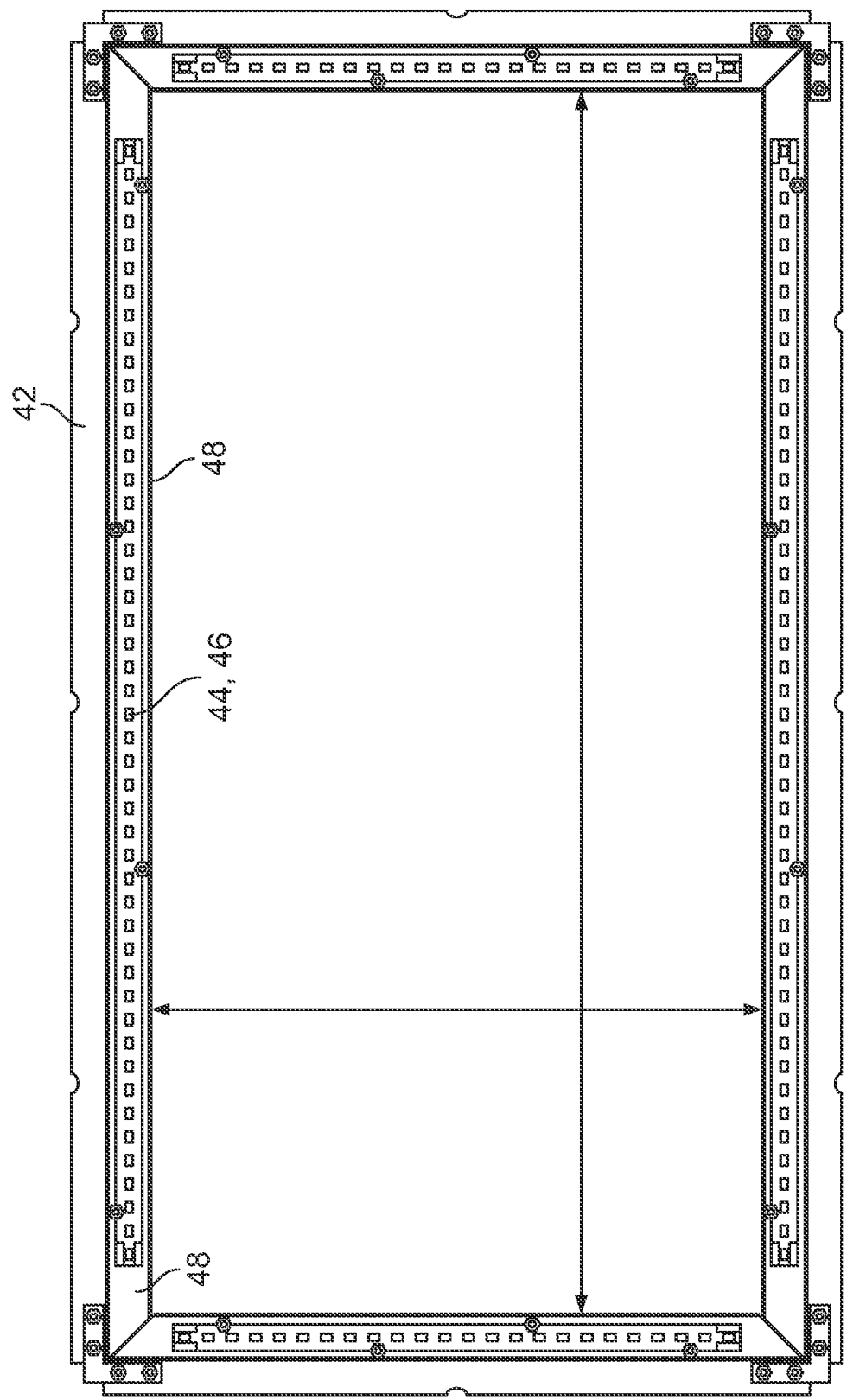
FIG. 3 is a plan view of a component of the abrasive blast cabinet shown in FIG. 1.
Figure 4:
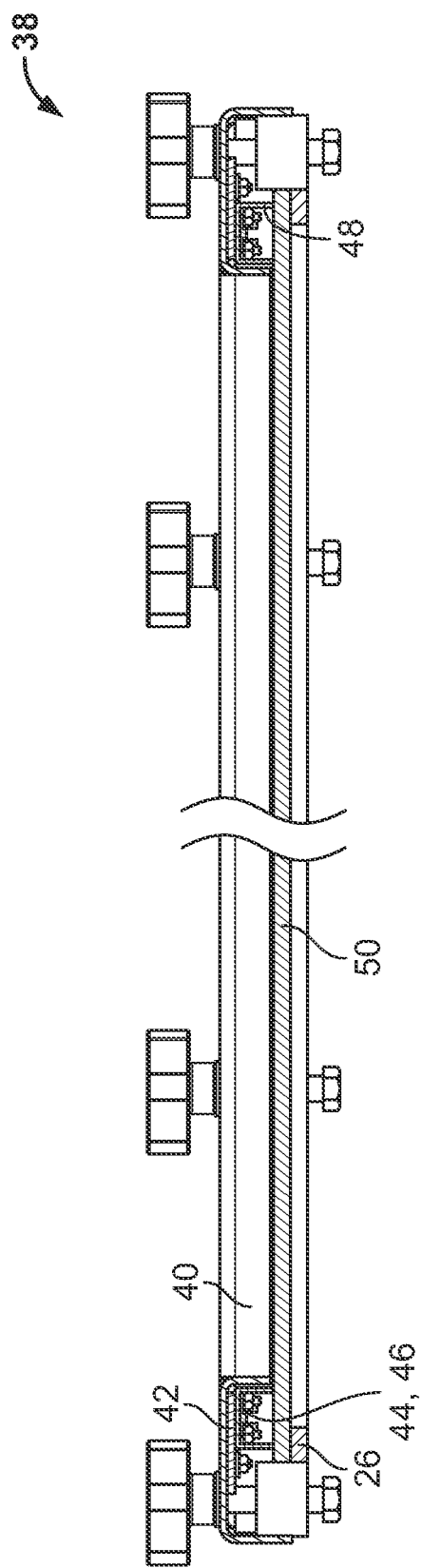
FIG. 4 is a cross sectional view taken at line 4-4 of FIG. 2.
Figure 5:
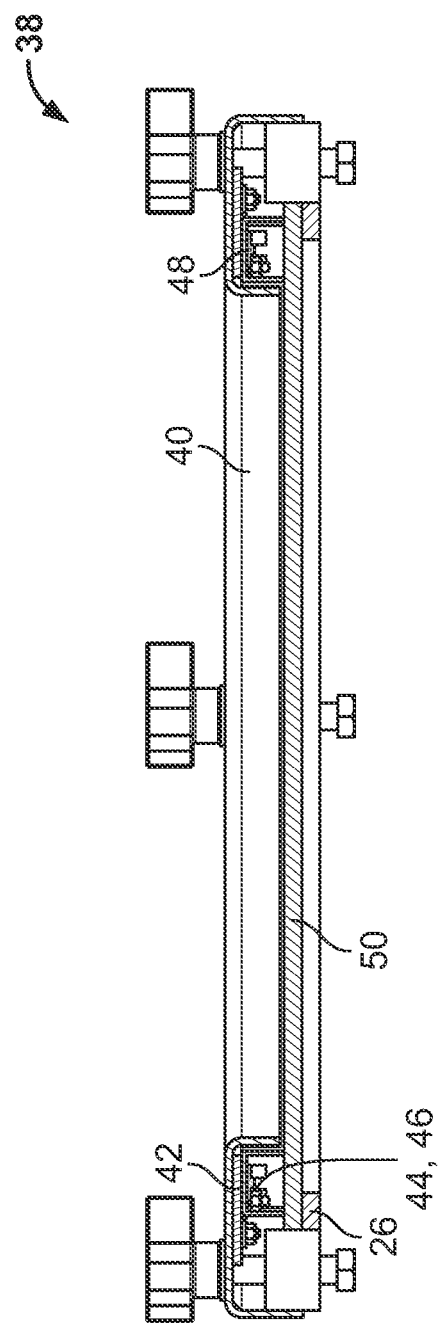
FIG. 5 is a cross sectional view taken at line 5-5 of FIG. 2.

A view port 34 is also positioned within the panel 26. View port 34 provides a line of sight 36 into the enclosed volume 22. As shown in FIGS. 1 and 2, the view port 34 is surrounded by a frame 38. Frame 38 is attached to panel 26 and, as shown in FIG. 2, the frame 38 comprises an outer frame 40 and an inner frame 42 captured between the outer frame and the panel 26. It has been found advantageous to mount one or more illumination devices 44, either directly or indirectly, on the panel 26. As shown in FIGS. 2 and 3, one or more illumination devices 44 may be positioned adjacent to the view port 34. In this example embodiment, a plurality of illumination devices 44 are mounted on the inner frame 42 and surround the view port 34. As shown in FIGS. 3, 4 and 5, the illumination devices 44 comprise strips of light emitting diodes 46 positioned within channel members 48 forming the inner frame 42. A transparent plate 50, which, in a practical design comprises a quarter inch sheet of safety glass, overlies the view port 34 and is captured between the frame 38 and the panel 26. In this example embodiment the illumination devices 44 are positioned between the transparent plate 50 and the frame 38. The transparent plate 50 cooperates with the channel members 48 comprising inner frame 42 to protect the illumination devices 44 from the blast environment within the enclosed volume 22. Although it is considered advantageous to use light emitting diodes 46 as illumination devices 44, other devices, such as incandescent or fluorescent bulbs may also be used.

Positioning the illumination device or devices 44 directly or indirectly on the panel 26, in particular, adjacent to and/or surrounding the view port 34, has been found to provide excellent illumination along the line of sight 36 into the enclosed volume 22 without significant shadowing, glare or distracting reflections, thereby allowing for more efficient and thorough abrasive blasting operations. Positioning the illumination devices 44 between the transparent plate 50 and the frame 38 outside of the enclosed volume 22 of the blast cabinet is expected to provide an enhanced measure of safety by avoiding any potential for an electrical spark within the dust laden environment of the enclosed volume.

What is claimed is:

1. An abrasive blast cabinet, said blast cabinet comprising:
   a plurality of panels attached to one another defining an enclosed volume;
   a view port positioned within one of said panels, said view port providing a line of sight into said enclosed volume;
   at least one illumination device mounted on said one panel adjacent to said view port;
   a frame mounted on said one panel surrounding said view port;
   a transparent plate positioned between said frame and said one panel, said transparent plate overlying said view port; wherein
   said at least one illumination device is positioned between said transparent plate and said frame.

2. The abrasive blast cabinet according to claim 1, wherein said at least one panel further comprises one or more access ports providing access to said enclosed volume.

3. The abrasive blast cabinet according to claim 1, wherein said at least one illumination device comprises a light emitting diode.

4. The abrasive blast cabinet according to claim 1, wherein said at least one illumination device comprises an incandescent bulb or a fluorescent bulb.

5. An abrasive blast cabinet, said blast cabinet comprising:
   a plurality of panels attached to one another defining an enclosed volume;
   a view port positioned within one of said panels, said view port providing a line of sight into said enclosed volume;
   a plurality of illumination devices mounted on said one panel wherein
   said plurality of illumination devices are positioned surrounding said view port.

6. The abrasive blast cabinet according to claim 5, further comprising:
   a frame mounted on said one panel surrounding said view port;
   a transparent plate positioned between said frame and said one panel, said transparent plate overlying said view port.

7. The abrasive blast cabinet according to claim 6, wherein said plurality of illumination devices are positioned between said transparent plate and said frame.

8. The abrasive blast cabinet according to claim 5, wherein said at least one panel further comprises one or more access ports providing access to said enclosed volume.

9. The abrasive blast cabinet according to claim 5, wherein said plurality of illumination devices comprise light emitting diodes.

10. The abrasive blast cabinet according to claim 5, wherein said plurality of illumination devices comprise at least one incandescent bulb or at least one fluorescent bulb.

11. An abrasive blast cabinet, said blast cabinet comprising:
   a space frame formed from a plurality of elongate members attached to one another;
   a plurality of panels attached to said elongate members, said panels defining an enclosed volume;
   a view port positioned within one of said panels, said view port providing a line of sight into said enclosed volume;
   one or more access ports positioned within said one panel providing access to said enclosed volume;
   a plurality of illumination devices mounted on said one panel;
   a frame mounted on said one panel surrounding said view port;
   a transparent plate positioned between said frame and said one panel, said transparent plate overlying said view port; wherein
   said plurality of illumination devices are positioned between said transparent plate and said frame.

12. The abrasive blast cabinet according to claim 11, wherein said space frame defines a parallelepiped.

13. The abrasive blast cabinet according to claim 11, wherein said space frame defines a cube.

14. The abrasive blast cabinet according to claim 11, wherein said space frame further comprises a plurality of legs formed from a plurality of said elongate members.

15. The abrasive blast cabinet according to claim 11, wherein said elongate members are tubular members.

16. The abrasive blast cabinet according to claim 15, wherein said tubular members have a rectangular cross section.

17. The abrasive blast cabinet according to claim 11, wherein said plurality of illumination devices comprise light emitting diodes.

18. The abrasive blast cabinet according to claim 11, wherein said plurality of illumination devices comprise at least one incandescent bulb or at least one fluorescent bulb.

* * * * *